Patented Feb. 5, 1935

1,990,010

UNITED STATES PATENT OFFICE 1,990,010

ASYMMETRICAL THIOINDIGOID DYESTUFF

Ernst Stöcklin, Binningen, near Basel, Switzerland, assignor to the firm Society of Chemical Industry in Basle, Basel, Switzerland No Drawing. Application December 29, 1933, Serial No. 704,601. In Switzerland January 4, 1933

7 Claims. (Cl. 260—53)

The present invention relates to asymmetrical indigoid dyestuffs of the general formula

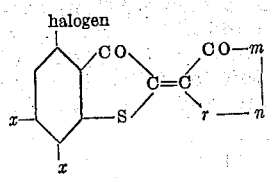

wherein one $x$ represents halogen, and the other $x$ alkyl, and wherein further two of the letters $m$, $n$ and $r$ represent two carbon atoms adjacent to each other and at the same time appertain to an aromatic ring system, and the third represents NH, C or S.

These asymmetrical indigoid dyestuffs are obtained by condensing hydroxythionaphthenes of the general formula

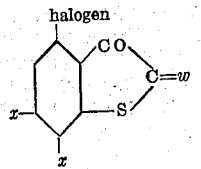

wherein one $x$ represents halogen, and the other $x$ alkyl, and wherein $w$ represents a reactive group, such as O, halogen, anil, 2H and NOH with a product of the general formula

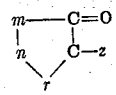

wherein $z$ represents a reactive group, such as O, halogen, anil, 2H and NOH, and wherein two of the letters $m$, $n$ and $r$ represent two carbon atoms adjacent to each other and at the same time appertain to an aromatic ring system, and the third represents NH, C or S, and, if desired, treating the dyestuffs obtained with halogenating agents, such as, for example, chlorine, bromine or sulfuryl chloride.

Hydroxythionaphthenes of the above general formula are, for instance, 4,6-dichloro-7-methyl-3-hydroxythionaphthene, 4,6-dichloro-7-ethyl-3-hydroxythionaphthene, 4,7-dichloro-6-methyl-3-hydroxythionaphthene, 4-bromo-6-chloro-7-methyl-3-hydroxythionaphthene, 4-chloro-6-bromo-7-methyl-3-hydroxythionaphthene, 4-chloro-7-bromo-6-methyl-3-hydroxythionaphthene, 4-bromo-7-chloro-6-methyl-3-hydroxythionaphthene, 4,6-dibromo-7-methyl-3-hydroxythionaphthene, 4,7-dibromo-6-methyl-3-hydroxythionaphthene, 4-bromo-6-chloro-7-methyl-3-hydroxythionaphthene-2-carboxylic acid, 4-chloro-7-bromo-6-methyl-3-hydroxythionaphthene-2-carboxylic acid, 2-(para-dimethylamino-) anil of 4,6 - dichloro- 7 -methyl- 3 -hydroxythionaphthene and 4,7-dichloro-6-methylthionaphthenequinone.

Products of the third named general formula are, for instance, five-membered condensed ring systems, like isatins, naphthisatins, indoxyls, thionaphthenequinones, hydroxythionaphthenes, naphthohydroxythiophenes, anthracenethioin-naphthohydroxythiophenes, anthraquinonethioindoxyls, anthraquinonethioindoxyls, acenaphthenequinones, phenanthrenequinones and the like, and the homologues and substitution products, anils and halides thereof.

The condensation takes place by heating the components in a solvent which may act as condensing agent.

The new dyestuffs may distinguish themselves in dyeing and printing animal fibers, such as, for example, wool and silk, or vegetable fibers, such as, for example, cotton or artificial silk from regenerated cellulose, by their great strength and their excellent fastness properties. They can be converted by known methods into leuco-ester salts.

The said hydroxythionaphthenes or their reactive 2-derivatives may be made by various methods; for example for making 4,6-dichloro-7-methyl-3-hydroxythionaphthene the following procedure may be adopted:—

From 1 - amino-2,4-dichloro-5-methyl-6-benzenesulfonic acid there is obtained by diazotizing and conversion of the diazo-compound thus obtained with cuprous cyanide the 1-cyan-2: 4-dichloro-5-methyl-6-benzenesulfonic acid, which by the action of phosphorous pentachloride is converted into the 1-cyan-2,4-dichloro-5-methyl-6-benzenesulfochloride easily soluble in benzene. The sulfochloride is then reduced and the mercaptan thus formed is condensed without further purification in a weakly alkaline solution with monochloracetic acid. During the reduction the cyanogen-group is simultaneously saponified to the —CO—HN₂ group. The 2,4-dichloro-5-methyl-6-phenylthioglycolcarboxylic acid-1-carboxylic acid amide thus obtained readily closes the ring already after a short boil in weakly alkaline solution to the 4,6-dichloro-7-methyl-3-hydroxythionaphthene, which crystallizes from alcohol in colorless needles of melting point 127° C.

The 4,7 - dichloro - 6 - methyl - 3 - hydroxythionaphthene can be made from the 1-amino-2, 5-dichloro-4-methyl-6-benzenesulfonic acid in a manner quite analogous to that described for making the 4,6-dichloro-7-methyl-3-hydroxythionaphthene. It crystallizes from alcohol in colorless needles of melting point 145° C.

From the 3-hydroxythionaphthenes of the above general formula the reactive 2-derivatives, such as, for example, the 2-anils, 2-oximes, 2-halides, are obtained in known manner by the interaction of nitroso compounds, nitrous acid or halogens. From the 2-anils the corresponding thionaphthenequinoneanils are obtained by saponification with, for example, sulfuric acid.

The following examples illustrate the invention, the parts being by weight:—

*Example 1*

233 parts of 4,6-dichloro-7-methyl-3-hydroxythionaphthene and 326 parts of 2-(para-dimethylamino-)anil of 6-ethoxy-3-hydroxythionaphthene are heated to the boil in 4000 parts of alcohol. After the condensation is complete the dyestuff of the formula

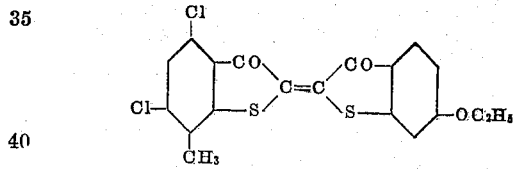

is filtered off, washed and dried. It represents a bright scarlet red powder which dissolves in concentrated sulfuric acid to a blue-green solution. The dyestuff forms a yellow vat and dyes cotton pure full scarlet tints of excellent fastness.

*Example 2*

233 parts of 4,7-dichloro-6-methyl-3-hydroxythionaphthene and 322 parts of 2-(para-dimethylamino-)anil of 2:1-naphthioindoxyl are heated together on the water bath in 4000 parts of chlorobenzene until the condensation is complete. After filtering and drying the dyestuff of the formula

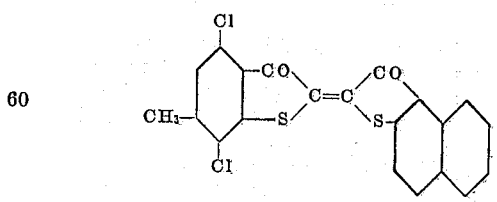

is obtained in the form of a brown-red powder which dissolves in concentrated sulfuric acid to a blue-green solution and dyes cotton from a red-yellow vat full pure red-brown tints.

*Example 3*

233 parts of 4,7-dichloro-6-methyl-3-hydroxythionaphthene are dissolved in 2000 parts of chlorobenzene and mixed at 70° C. with a solution of 5,7-dibromisatinchloride produced in known manner from 305 parts of 5,7-dibromisatin and 250 parts of phosphorus pentachloride in chlorobenzene. After stirring for a short time the condensation is complete. After filtering, washing and drying the dyestuff of the formula

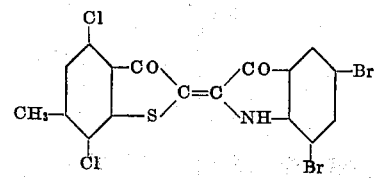

is obtained in the form of a dark violet powder which dissolves in concentrated sulfuric acid to a green solution and dyes cotton from a yellow vat blue-violet tints.

By substituting in this example 216 parts of 5:7-dichlorisatin for the 5,7-dibromisatin there is obtained a dyestuff having similar properties.

A dyestuff possessing similar properties is obtained by substituting in this example 233 parts of 4,6 - dichloro - 7 - methyl-3-hydroxythionaphthene for the 4,7-dichloro-6-methyl-3-hydroxythionaphthene used.

*Example 4*

233 parts of 4,7-dichloro-6-methyl-3-hydroxythionaphthene and 216 parts of 5,7-dichlorisatin are heated in 3000 parts of glacial acetic acid until the dyestuff formation is complete. After filtering, washing and drying the dyestuff of the formula

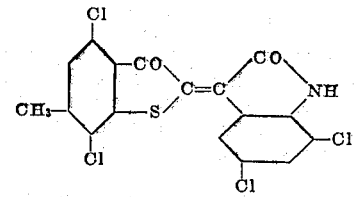

is obtained as a brown-red powder which dissolves in sulfuric acid to a blue-green solution and dyes cotton from a yellow vat red tints.

By substituting in this example equal parts of 4,6 - dichloro-7-methyl-2-hydroxythionaphthene for the 4,7-dichloro-6-methyl-3 - hydroxythionaphthene there is obtained a dyestuff having similar properties.

*Example 5*

233 parts of 4,7-dichloro-6-methyl-3-hydroxythionaphthene and 222 parts of α-isatin-anilide are heated to boiling in 4000 parts of alcohol. After the condensation is complete the dyestuff of the formula

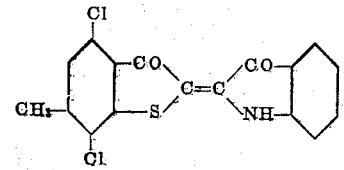

is filtered off, washed and dried. It represents a blue-red powder which dissolves in concentrated sulfuric acid to blue-green solution and dyes cotton from a yellow vat reddish-blue tints.

By substituting in this example equal parts of 4,6-dichloro-7-methyl - 3 - hydroxythionaphthene for the 4,7 - dichloro-6-methyl-3-hydroxythionaphthene there is obtained a dyestuff having similar properties.

*Example 6*

362 parts of the dyestuff obtained in Example 5 are dissolved in 6000 parts of concentrated sulfuric acid, while cooling, and the solution thus obtained is stirred with 130 parts of bromine, while slowly raising the temperature until the bromination is complete. The dyestuff which has precipitated by pouring the solution on ice is filtered, washed and dried. It represents a reddish blue powder which dissolves in concentrated sulfuric acid to a blue-green solution and dyes cotton from a yellow vat reddish blue tints.

If in this example the 362 parts of the dyestuff obtained in Example 5 are replaced by 429 parts of the dyestuff No. X of the table, there is obtained a violet dyestuff which dissolves in concentrated sulfuric acid to a green solution and dyes cotton from a red-yellow vat violet tints.

The following table displays further examples of dyestuffs obtainable according to this invention from 4,6-dichloro-7-methyl-3-hydroxythionaphthene or 4,7-dichloro-6-methyl-3-hydroxythionaphthene, respectively:—

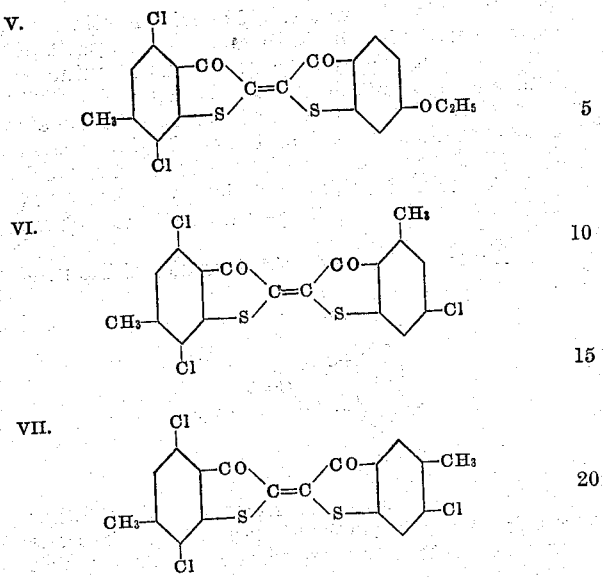

| 4,6-dichloro-7-methyl-3-hydroxythionaphthene and:— | Color of the dyestuff | Color in sulfuric acid | Color of the vat | Color of the dyed cotton |
|---|---|---|---|---|
| I. 2-(para-dimethylamino-)-anil of 4-methyl-6-chloro-3-hydroxythionaphthene. | Pink | Green | Yellow | Pure pink |
| II. 2-(para-dimethylamino-)-anil of 5-methyl-6-chloro-3-hydroxythionaphthene. | Red | Green | Green-yellow | Red |
| III. 2-(para-dimethylamino-)-anil of 5-chloro-7-methyl-3-hydroxythionaphthene. | Red | Green | Green-yellow | Red |
| IV. 2-(para-dimethylamino-)-anil of 1-chloro-2,3-naphthioindoxyl | Violet | Green | Red-yellow | Violet |
| 4,7-dichloro-6-methyl-3-hydroxythionaphthene and:— | | | | |
| V. 2-(para-dimethylamino-)-anil of 6-ethoxy-3-hydroxythionaphthene | Scarlet | Green | Yellow | Scarlet |
| VI. 2-(para-dimethylamino-)-anil of 4-methyl-6-chloro-3-hydroxythionaphthene. | Red | Green | Yellow | Pink |
| VII. 2-(para-dimethylamino-)-anil of 5-methyl-6-chloro-3-hydroxythionaphthene. | Red | Green | Yellow | Red |
| VIII. 2-(para-dimethylamino-)-anil of 5-chloro-7-methyl-3-hydroxythionaphthene. | Blue-red | Green | Yellow | Bluish-red |
| IX. 2-(para-dimethylamino-)-anil of 1,2-naphthioindoxyl | Brown | Blue-green | Yellow | Bordeaux |
| X. 2-(para-dimethylamino-)-anil of 2,3-naphthioindoxyl | Blue | Green | Red-yellow | Violet |

The dyestuffs I to X of the foregoing table correspond with the following formulas:—

I. 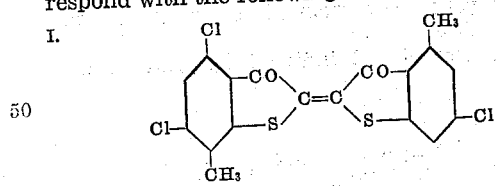

II. 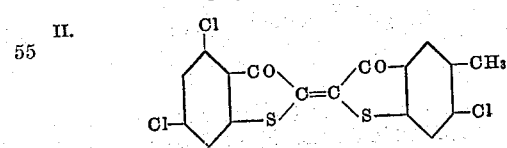

III. 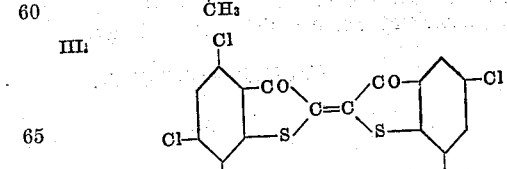

IV. 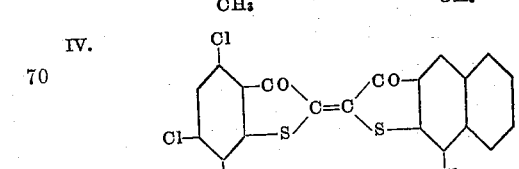

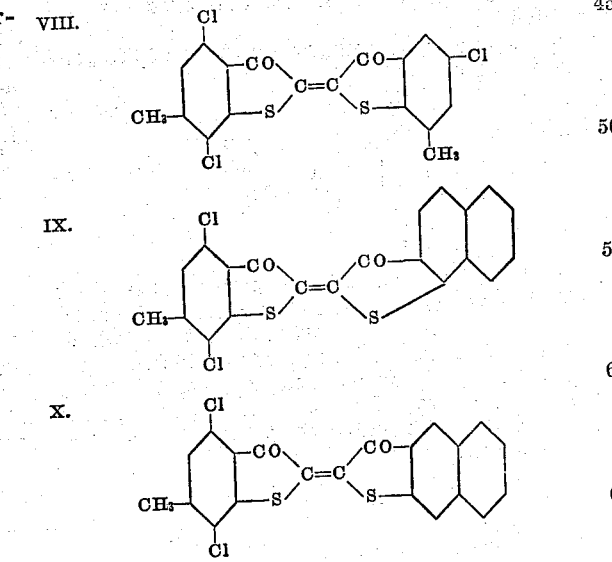

*Example 7*

5 parts of the dyestuff described in Example 2 are made into the paste with 20 parts of caustic soda solution of 33 per cent. strength. There are then added 750 parts of water at 70° C. and 15 parts of sodium hydrosulfite the whole being allowed to stand for 30 minutes and then diluted to 2000 parts with water. 100 parts of cotton are now entered into the bath at 60° C., 50 parts of common salt are added after about 10 minutes and dyeing is continued for ½ hour at 60° C. The material is then washed, oxidized in the air for 30 minutes, rinsed and soaped. The cotton is thus dyed very fast red-brown tints. For wool, silk and artificial silk the dyeing process must of course be varied to suit the nature of these fibers.

What I claim is:—

1. Asymmetrical indigoid dyestuffs of the general formula

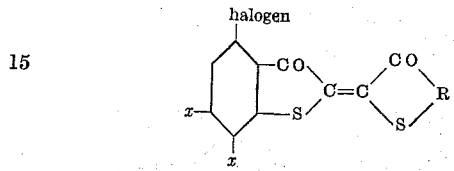

wherein one $x$ represents halogen, and the other $x$ alkyl, wherein further R represents a benzene or naphthalene or anthracene radical which products form red to blue powders which dissolve in concentrated sulfuric acid to green solution, yield with hydrosulfite and caustic soda solution yellow vats, from which cotton is dyed fast red to blue tints.

2. Asymmetrical indigoid dyestuffs of the general formula

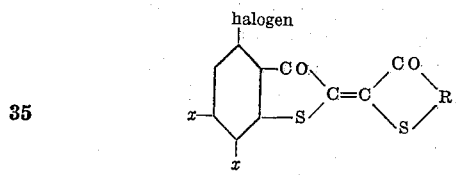

wherein one $x$ represents halogen, and the other $x$ methyl, wherein further R represents a benzene or naphthalene or anthracene radical, which products form red to blue powders which dissolve in concentrated sulfuric acid to green solutions, yield with hydrosulfite and caustic soda solution yellow vats, from which cotton is dyed fast red to blue tints.

3. Asymmetrical indigoid dyestuffs of the general formula

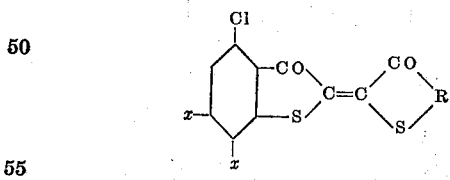

wherein one $x$ represents halogen, and the other $x$ methyl, wherein further R represents a benzene or naphthalene or anthracene radical, which products form red to blue powders which dissolve in concentrated sulfuric acid to green solutions, yield with hydrosulfite and caustic soda solution yellow vats, from which cotton is dyed fast red to blue tints.

4. Asymmetrical indigoid dyestuffs of the general formula

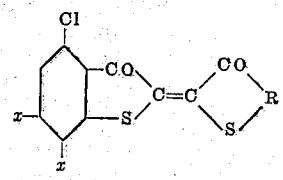

wherein one $x$ represents chlorine, and the other $x$ methyl, wherein further R represents a benzene or naphthalene or anthracene radical, which products form red to blue powders which dissolve in concentrated sulfuric acid to green solutions, yield with hydrosulfite and caustic soda solution yellow vats, from which cotton is dyed fast red to blue tints.

5. Asymmetrical indigoid dyestuffs of the general formula

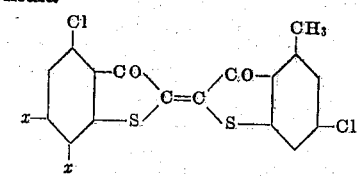

wherein one $x$ represents chlorine, and the other $x$ methyl, which products form red powders which dissolve in concentrated sulfuric acid to green solutions, yield with hydrosulfite and caustic soda solution yellow vats, from which cotton is dyed fast pink tints.

6. An asymmetrical indigoid dyestuff of the formula

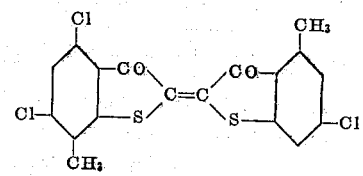

which product forms a pink powder which dissolves in concentrated sulfuric acid to green solution, yields with hydrosulfite and caustic soda solution a yellow vat, from which cotton is dyed pure pink tints.

7. An asymmetrical indigoid dyestuff of the formula

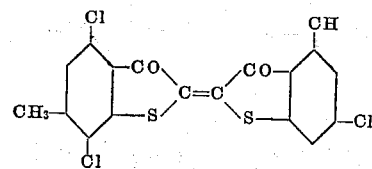

which product forms a red powder which dissolves in concentrated sulfuric acid to a green solution, yields with hydrosulfite and caustic soda solution a yellow vat, from which cotton is dyed pink tints.

ERNST STÖCKLIN.